United States Patent [19]

Iwata et al.

[11] Patent Number: 4,472,042
[45] Date of Patent: Sep. 18, 1984

[54] FLASH CAMERA

[75] Inventors: Hiroshi Iwata, Ikoma; Hajime Mitsui, Izumi, both of Japan

[73] Assignee: West Electric Company, Ltd., Osaka, Japan

[21] Appl. No.: 392,477

[22] Filed: Jun. 28, 1982

[30] Foreign Application Priority Data

Jun. 29, 1981 [JP] Japan ............................. 56-101670

[51] Int. Cl.³ ............................................. G03B 15/05
[52] U.S. Cl. .................................... 354/418; 354/419; 354/149.11
[58] Field of Search ............................ 354/32–35, 354/60 F, 126–128, 145, 418, 419, 149.11; 362/4, 7, 372, 383; 315/149, 150, 158, 241 P

[56] References Cited

U.S. PATENT DOCUMENTS 4,153,355  5/1979  Ikawa et al. ................... 354/145 X
4,407,573 10/1983  Wakabayashi et al. ............. 354/33

FOREIGN PATENT DOCUMENTS 87028  7/1981  Japan ................................ 354/32

Primary Examiner—William B. Perkey
Attorney, Agent, or Firm—Cushman, Darby & Cushman

[57] ABSTRACT

In a photographic camera provided with an electronic flash unit comprising a strobo lamp, the strobo lamp part is raised up and down by means of a small electric motor and gear link when the brightness of the object scenery is dark at a pressing of shutter release button to a midway position. The raising up of the strobo lamp part is automatically done by detection of the scenery brightness and switching on of the motor by an electronic circuit. When the strobo lamp part reaches the raised position, a limit switch causes the electronic switch circuit to stop the motor.

13 Claims, 3 Drawing Figures

FLASH CAMERA

BACKGROUND OF THE INVENTION

1. Field of the Technology of the Invention

The present invention relates to a flash camera that has a built-in electronic flashing unit, which is raised up or pops up and is automatically to be switched on for a ready-to-flash state when measured brightness of the objective scenery is dark.

2. Description of the Prior Art

Conventional exemplary photographic camera having a built-in electronic flashing unit (hereinafter referred to as EFU) generally has such structure that, when scenery brightness decreases such that flashing is required for photographing, the camera makes some signs of warning for the photographer for the low brightness, then the photographer switches on the EFU or turns a lever for popping up of the EFU which is then switched on at its popped up position.

Another conventional exemplary type of camera with built-in EFU has the construction that its EFU is electrically connected to a scenery brightness measuring circuit of the camera, and when a shutter release button is pressed to a midway position under a low scenery brightness condition, the EFU circuit is automatically switched on, and remaining switched-on until one shot by the camera is made.

The former type construction of the conventional flash camera has a shortcoming that the photographer may make a failure in photographing when he or she forgets or neglects to operate the lever to pop up the EFU, since the EFU is constructed to be manipulated by the photographer. Besides, in the former type flash camera, which is designed to maintain the EFU in stand-by state after once-pressing of the shutter release button to a half-pressed position at dark photographic scenery, for variation of objective brightness to a brighter one the photographer must manually operate the EFU lever to restore it.

The latter type construction is suitable for drawing-out type small camera, such as ones using 110 type film, wherein distance between the strobo lamp part and the lens can be designed to be great enough so that the so-called "pink eye" phenomenon is effectively prevented. But in other type flash cameras such as of 35 mm film type camera, wherein the distance between the EFU and the lens cannot be very great especially when size of the camera is designed to be smaller, the pop-up or raising up of the EFU lamp part is necessary for prevention of the pink eye phenomenon.

That is, even in the latter type cameras of automatic brightness-responsive switching to stand-by state, the raising up of the built-in lamp part is necessary.

SUMMARY OF THE INVENTION

The present invention provides a flash camera having a built-in EFU which automatically moves to a flashing position, which is more distant from the lens axis than the resting, i.e. restoring position.

More particularly, the present invention provides a flash camera having a built-in EFU lamp part which is driven by an electric motor up to the raised flashing position and down to the restoring position, responding to measured objective brightness. The brightness measurement is made by a known light measuring circuit for selecting exposure of photographing. The driving is made by a reduction gears, rack and pinion linkage. In one embodiment, the rising up of the lamp part is driven by a motor linked via a one-directional clutch, and lowering of the lamp part is made by a spring upon releasing a latch for retaining the raised position. In another embodiment, when the EFU lamp part is once driven out and then restored, the next brightness measurement is prohibited until another midway pressing of the shutter release button. In another embodiment, once the EFU lamp part is driven out, subsequent restoration of it into the restoring position before a shutter releasing is prohibited. Furthermore in another embodiment, the electronic circuit for switching the lamp part driving motor responding to measured objective brightness has an appropriate hysteresis characteristic with respect to the objective brightness, so that undesirable excessive repetition of rise-up and fall down motion of the EFU lamp part around the threshold objective brightness is prevented.

The flash camera with a built-in electronic flashing unit in accordance with the present invention comprises a built-in electronic flashing unit having a movably installed flashing part, a moving means including an electric motor for moving the flashing part at least from a resting position to a flashing position, and a linking means for mechanically linking the motor and the flashing part, a motor control circuit for controlling current of the motor, a brightness detection circuit for detecting brightness of a photographic object, and a power control circuit for controlling feeding of power to the motor control circuit and the brightness detection circuit.

DESCRIPTION OF THE PREFERRED EMBODIMENT

Figure 1:
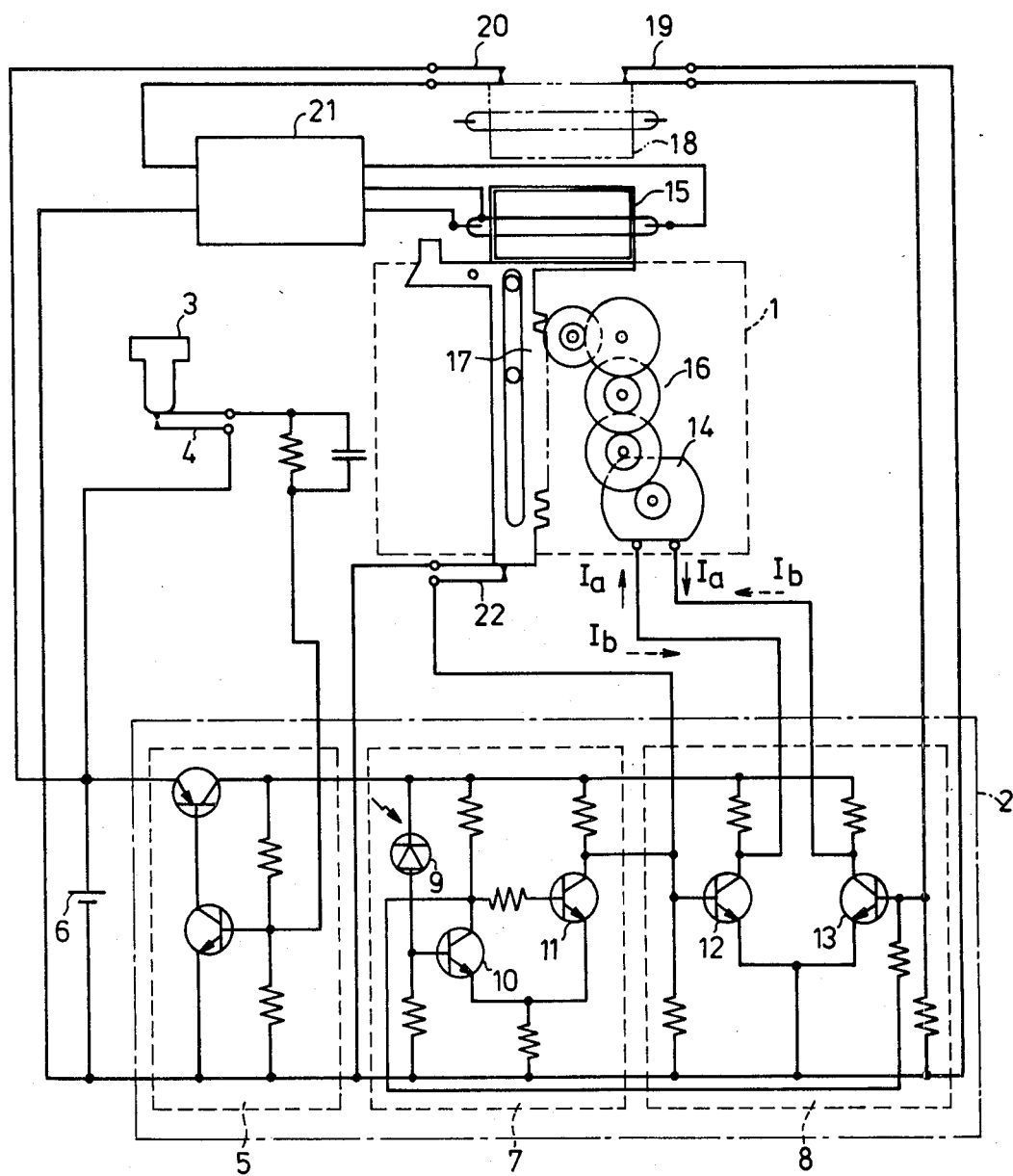
FIG. 1 is a circuit diagram of a first example of a flash camera embodying the present invention.

FIG. 1 shows a first example of flash camera embodying the present invention wherein the circuit includes a moving means 1 and an electronic circuit part 2.

A shutter release button 3 has a power switch 4, which is switched on when the release button 3 is at least lightly pressed namely pressed, i.e. at least to a midway position to shutter releasing position.

When at least an instant closing of the switch 4 is made, a power control circuit 5 of a known configuration self-holding switching circuit connects the output of a power source 6 to a brightness detection circuit 7 and a motor control circuit 8.

Then, when the objective brightness is darker than a predetermined level and hence the output current of a light measuring sensor, e.g. a phototransistor 9, is lower than a predetermined level, a transistor 10 is in the OFF state and a transistor 11 is in the ON state. Therefore, by receiving the collector voltage thereof, transistors 12 and 13 become OFF and ON, respectively, thereby feeding a current $I_a$ to the motor 14. Motor 14 drives through a gear link 16 and a rack 17 to raise the flashing part 15 to a predetermined flashing position. When the flashing part 15 reaches the flashing position, limit switches 19 and 20, which are connected to short-circuit the base-emitter circuit of the transistor 13 and to form a charging circuit for the main capacitor (not shown) of a strobo circuit 21, respectively are activated to ON state, thereby turning the transistor 13 OFF, and turning the strobo circuit 21 ON to start charging of the main capacitor therein. As a result of the turning OFF of the transistor 13, the current of the motor 14 is stopped and the flashing part is retained in the raised flashing position. The flashing position is the position that the flashing part 15 is moved apart from the lens axis, and accordingly is desirable for prevention of the pink eye phenomenon. Since the strobo circuit 21 starts to charging its main capacitor, it soon comes to a state of ready-for-flashing, and subsequently flashes upon reception of a triggering signal.

If, during the above state, without using the EFU by the photographer, the direction of the camera is changed to a photographic object of a sufficient brightness, the current from the light measuring device 9 increases, thereby turning the transistor 10 ON, hence transistor 13 OFF, and the transistor 11 OFF, hence the transistor 12 ON. Accordingly, the direction of the motor current $I_a$ is reversed to $I_b$ of FIG. 1, thereby driving the rack 17. Hence, the flashing part 15 lowered to the resting, i.e. restoring position. When the flashing part 15 reaches the resting position, a limit switch 22 connected to short-circuit the base-emitter circuit of the transistor 12 is switched ON and turns the transistor 12 OFF, thereby cutting off the current $I_b$ to the motor 14. At this time, since the switch 20 turns OFF, the strobo circuit 21 is turned OFF and the charging of its main capacitor is stopped.

When the photographer puts the camera in a bag or in a camera case, the light does not come into the light measuring sensor 9, and therefore in the same way to the above-mentioned, the flashing part is pulled down to the resting position.

In the above-mentioned example of FIG. 1, since the flashing part 15 is automatically raised and lowered by the motor 14 responding to the objective brightness and automatically switches ON or OFF the strobo circuit 21, the conventional problems of failure of exposure and necessity of raising of the flashing part 15 to prevent pink-eye phenomenon are eliminated. Furthermore, since the raising up and lowering of the flashing part is made by the motor with reduction gear link, there is no mechanical shock to the strobo lamp of the flashing part 15 apart from the conventional ones where the popping up of the flashing part is made by a spring which is released by manipulating a lever. Therefore, the apparatus embodying the present invention is desirable for a fragile strobo tube such as an Xe discharge lamp.

Still furthermore, by designing the Schmidt circuit 7 for producing the light measuring signal in a manner to have a proper hysteresis of its photo-electric characteristics, excessively sensitive repetitions of raising up and lowering of the flashing part 15 can be prevented even when the objective brightness is changing around the threshold brightness level.

Figure 2:
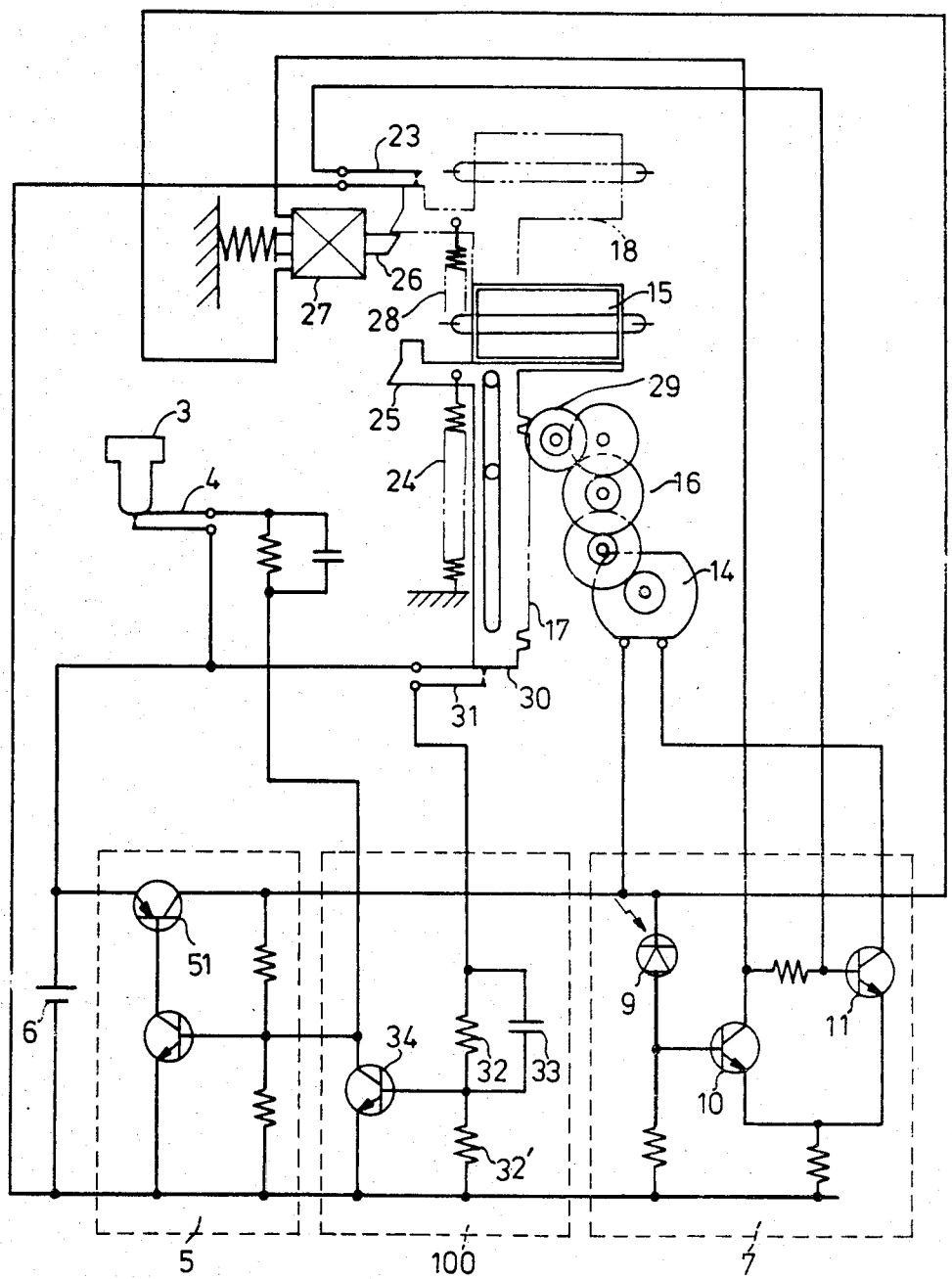
FIG. 2 is a circuit diagram of a second example of a flash camera embodying the present invention.

FIG. 2 shows a second example wherein the raising of the flashing part 15 is done by rotation of the motor 14, and the lowering of the flashing part 15 is made by a restoring spring which is charged during the raising. In this circuit, instead of the motor control circuit 8 of FIG. 1, a timer circuit 100 comprising a transistor 34 and a time constant circuit of a capacitor 33 and resistors 32 and 32' is employed. Elucidation about components and parts corresponding to those shown in FIG. 1 and hence elucidated thereon are omitted herein. A known clutch gear 29 is provided in the reduction gear link so as to be coupled when the motor 14 rotates to raise the flashing part 15 and is decoupled when the motor ceases its rotation. A latch 26 is provided so as to catch an engage tab 25 connected to the rack 17 when the flashing part 15 reaches the predetermined flashing position. A tension spring 24 is provided to restore the latch 17. The latch 26 has a spring as usual and has a releasing electromagnetic plunger 27 which pulls the latch 26 to disengage the engage tab 25. The plunger 27 is designed not to be actuated when the base current of the transistor 11 only is flowing therethrough. A lower limit switch 31 is provided instead of the counterpart in FIG. 1, and the limit switch 31 is connected to resistor 32 and capacitor 33 of timer circuit 100.

When the shutter release button 3 is half pressed, the power source is connected to the brightness measuring circuit 7, which keeps the transistor 10 OFF and the transistor 11 ON. Accordingly, the motor 14 is actuated and rotates, and the flashing part 15 is raised. At this time, the plunger 27 does not form the deengaging force. Instead of the upper limit switch 19 of FIG. 1, an upper limit switch 23 is provided, and the upper limit switch and the plunger 27 are connected in series between the power control circuit 5 and the base of the transistor 11 connected to the collector of the transistor 10.

The operation of the embodiment of the present invention shown in FIG. 2 is as follows: When the switch 4 is closed at least once, the power control circuit 5 connects the power source 6 to a brightness measuring circuit 7 comprising the Schmidt circuit. Then, when the objective brightness is darker than a predetermined level and hence the output current of a light measuring sensor 9 is lower than a predetermined level, the transistor 10 is OFF and the transistor 11 is ON, thereby energizing the motor 14 to raise the flashing part 15. When the flashing part 15 reaches a predetermined flashing position and the limit switch 23 switches ON, the transistor 11 turns OFF and the motor 14 stops. During the raising up of the flashing part 15, the restoring spring 24 is also extended. And at the flashing position 18 (indicated by the broken line), of the flashing part 15 the latch 26 engages the engaging tab 25, and spring 24 remains extended. Then, if during the above state, without using the EFU by the photographer, the direction of the camera is changed to a photographic object of a sufficient brightness, the current from the light measurement device 9 increases. Thereby, the transistor 10 turns ON, and the plunger 27 is energized to pull the latch 26 therein (leftwards of FIG. 2), thereby disengaging the engaging tab 25 and admitting the flashing part 15 to restore downwards. In this restoring motion, the clutch gear 29 is in the disengaging state. When the flashing part 15 reaches the resting position, the limit switch 31 closes. Therefore, the capacitor 33, which has been discharged through the resistor 32, begins to charge. Only during the charging time, which is determined by the time constant of the resistor 32' and the capacitor 33, the transistor 34 becomes ON, thereby turning the switching transistor 51 OFF, and the whole circuit ceases until the next half pushing of the release button.

Though not shown in FIG. 1, the timer circuit 100 of FIG. 2 which is to be connected to the power control circuit 5 for switching it OFF may be used in the embodiment shown is FIG. 1.

Furthermore, the above-mentioned timer circuit 100 may be connected in series to a switch which is to be short circuited after every operation of the shutter. In this way, undesirable useless flashings after a shutter releasing is prevented by preventing the raising of the flash part even at another midway pressing of the shutter release button. This connection can be of course applicable to the embodiment shown in FIG. 1.

Though not shown in FIG. 2, the switch of the EFU may or may not be the same way as shown in the embodiment of FIG. 1.

For actual use of the movably built-in EFU, another embodiment of the present invention elucidated as follows is also preferable in order to prevent undesirable frequent repetition of rise-up and lowering motions of the flashing part 15 at around a threshold objective brightness level. This is attained by inhibiting the lowering of the flashing part 15 during a period from reaching to the flashing position to a full charging to the main capacitor of the EFU. Such devicing is made in a third embodiment.

Figure 3:
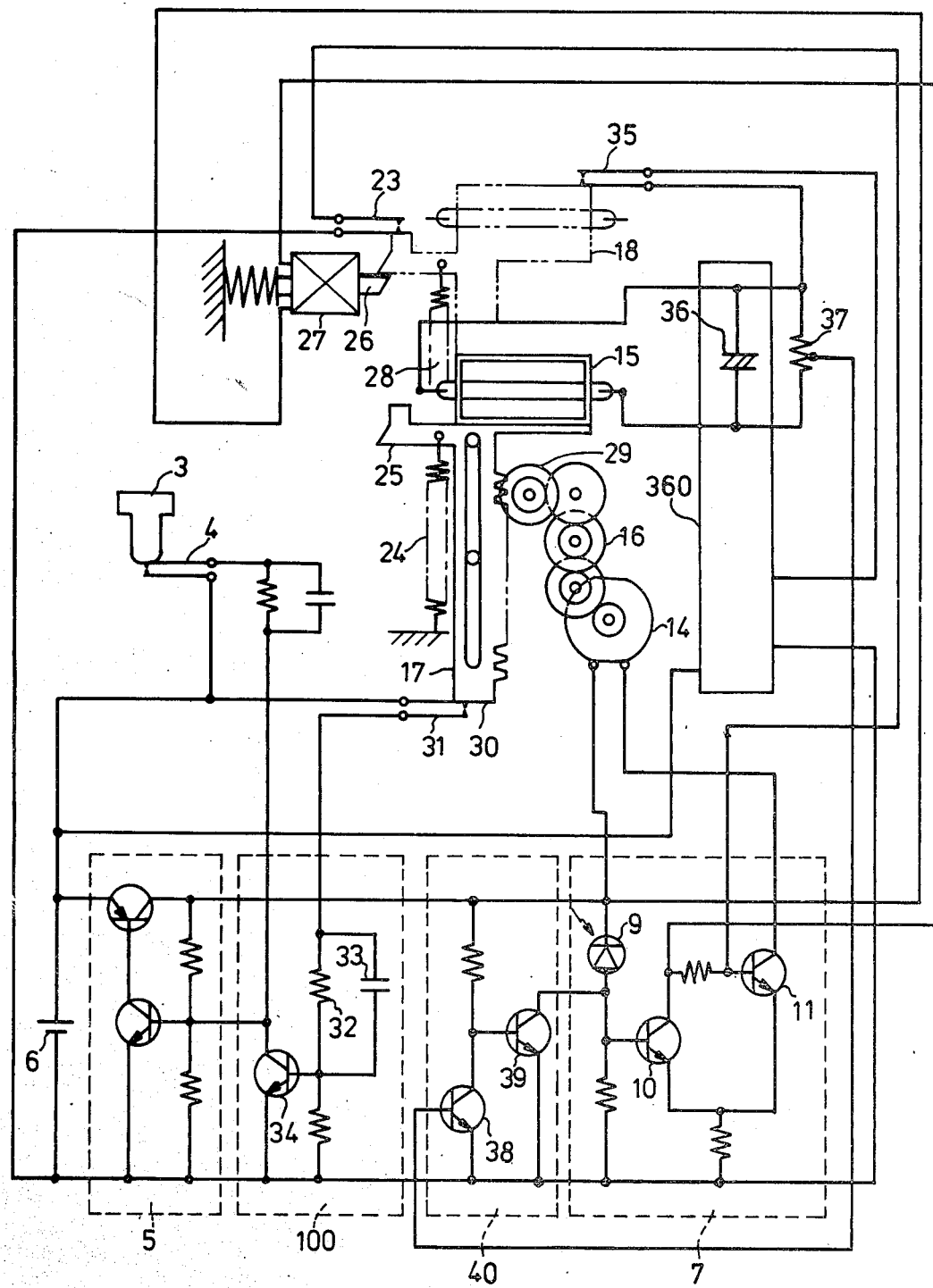
FIG. 3 is a circuit diagram of a third example of a flash camera embodying the present invention.

FIG. 3 shows the third embodiment of the present invention of a flash camera wherein a flashing part holding circuit 40 is provided besides the circuits of FIG. 2. Elucidation about components and parts corresponding to those shown in FIG. 1 and FIG. 2 and hence elucidated thereon are omitted herein. The feature of this example is to detect the voltage of the main capacitor 36 of a strobo circuit 360, by a voltage divider 37 connected across the main capacitor 36. The output terminal of the voltage divider 37 is connected to the base of a transistor 38 of a switching circuit for the flashing part holding circuit 40. The output of the flashing part holding circuit 40, i.e. the collector of the transistor 39, is connected to the input terminal of the brightness measuring circuit 7. Other parts are substantially the same as the circuit of FIG. 2.

When the release shutter button 3 is half pressed, the power source is connected to the timer circuit 100, the holding circuit 40 and the brightness measuring circuit 7, which keeps the transistor 10 OFF and the transistor 11 ON. Accordingly the motor 14 is energized and rotates, and the flashing part 15 is raised. When the flashing part 15 reaches the predetermined flashing position and the limit switch 23 switches ON, the transistor 11 turns OFF and the motor 14 stops. At the same time, another limit switch 35 is also closed thereby completing a charging circuit for the main capacitor 36, and capacitor 36 starts charging. The charged voltage is detected through the voltage divider 37 and is impressed on the base of the transistor 38. Therefore, until the voltage of the capacitor 36 reaches a predetermined considerable value, the transistor 38 is kept in OFF state, and the transistor 39 is in ON state. Therefore, the transistor 10 is prohibited from turning ON, even when the objective brightness turns above a predetermined threshold level, and thus holds the plunger 27 inoperative, and thereby retains the flashing part 15 at the flashing position.

Thereafter, after a lapse of a certain time, the main capacitor 36 becomes fully charged, and the transistor 38 and 39 turn ON and OFF, respectively. In this state the transistor 10 can turn ON whenever the brightness measured by the detector 9 becomes above the threshold level. By this turning ON of the transistor 10, the plunger 27 becomes excited, thereby allowing the flashing part 15 to be pulled down by the restoring spring 24.

The flash camera in accordance with this example can prohibit undesirable accidental lowering of the flashing part 15 at the time immediately after start of its rising, even if the objective brightness suddenly drifts somewhat brighter for a very short time, for example by flickering of lamp or the like, or even if some noise light accidentally comes in the photographic picture angle. Therefore, by prohibiting undesirable interruption of the charging of the main capacitor 36, the charging becomes quicker and energy utility becomes more efficient, and utility of the flash camera is easier.

What is claimed is:

1. A flash camera including an electronic flashing means for automatically artificially illuminating a photographic scene when a shutter button is depressed, comprising:
   light sensing means for producing a first signal when the natural illumination of said photographic scene is below a predetermined level;
   drive means responsive to said first signal for moving said flashing means from a predetermined retracted position to a predetermined flashing position;
   limit switching means for detecting if said flashing means has moved to said predetermined flashing position and for inhibiting said drive means when said detected position of said flashing means is said predetermined flashing position; and
   illuminating means for artificially illuminating said photographic scene when said shutter button is depressed and said flashing unit is in said predetermined flashing position.

2. A flash camera comprising:
   an integral electronic flashing unit including a moveable flashing part;
   electric motor means for moving said flashing part at least from a predetermined resting position to a predetermined flashing position by converting electrical energy to mechanical energy;
   linking means for mechanically linking said motor means to said flashing part;
   brightness detecting means for producing a first signal indicative of the brightness of a photographic object;
   motor control means responsive to said first signal for controlling said electric motor means;
   power supply means for providing power to said motor control means and said brightness detection means; and
   limit switching means for detecting if said flashing part has moved to said predetermined flashing position and for controlling said motor control means to de-energize said electric motor means when the detected position of said flashing part is said predetermined flashing position.

3. A flash camera in accordance with claim 2, wherein said brightness detection means comprises:
   a brightness measuring device; and
   switching means responsive to an output of said brightness measuring device and having a predetermined hysteresis characteristic for producing said first signal.

4. A flash camera in accordance with claim 2, wherein said
   limit switch means include means for connecting said power supply means to said integral electronic flashing unit when said flashing part is moved to said predetermined flashing position.

5. A flash camera comprising:
an integral electronic flashing unit including a moveable flashing part;
electric motor means for moving said flashing part at least from a predetermined retracted position to a predetermined flashing position by converting electrical energy to mechanical energy;
linking means for mechanically linking said motor means to said flashing part;
brightness detecting means for producing a first signal indicative of the brightness of a photographic object;
motor control means responsive to said first signal for controlling said electric motor means;
power supply means for providing power to said motor control means and said brightness detection means;
limit switching means for controlling said motor control means to de-energize said electric motor means when said flashing part is moved to said predetermined flashing position;
biasing means for biasing said flashing means toward said first predetermined retracted position; and
electromagnetic engaging means responsive to said first signal for retaining said flashing means in said predetermined flashing position despite the bias of said biasing means.

6. A flash camera as in claim 5, further comprising:
hysteresis means responsive to said first signal for controlling said electromagnetic engaging means to retain said flashing means in said predetermined flashing position for a predetermined time after said light sensing means ceases to produce said first signal to prevent fluctuations of short duration in the natural illumination of said photographic scene from affecting the position of said flashing means.

7. A flash camera including a camera and an electronic flashing unit to provide artificial illumination operatively combined with said camera, said electronic flashing unit comprising a flashing part movable between a predetermined rest position and a predetermined flashing position, the improvement comprising:
shutter button means for actuating said camera and said electronic flashing unit;
power supply means for providing electrical power;
first switching means responsive to said shutter button means for connecting said power supply means to said electronic flashing unit;
brightness detecting means for producing a first signal indicative of the brightness of a photographic scene, comprising:
light measuring means connected to said power supply means for detecting the brightness level of said photographic scene; and
second switching means responsive to said light measuring means for producing said first signal;
moving means for moving said flashing part between said predetermined rest position and said predetermined flashing position, comprising:
motor means responsive to said first signal for converting electrical energy of said power supply means into mechanical energy; and
linking means for transmitting said mechanical energy from said motor means to said flashing part to move said flashing part between said predetermined rest position and said predetermined flashing position;
biasing means for exerting a force to bias said flashing part toward said predetermined rest position;
retaining means for retaining said flashing part in said predetermined flashing position despite the force exerted by said biasing means, comprising:
electromagnetic means responsive to said first signal for retaining said flashing part in said predetermined flashing position despite the force exerted by said biasing means once said flashing part is moved to said predetermined flashing position by said moving means;
first limit switch means for disconnecting said motor means from said power supply means when said flashing part reaches said predetermined flashing position;
second limit switch means for producing a second signal when said flashing part reaches said predetermined rest position; and
time constant means responsive to said second signal for disconnecting said power supply means from said electronic flashing unit a predetermined time after said flashing part reaches said predetermined rest position.

8. A flash camera in accordance with claim 7, wherein said linking means comprises:
revolution speed reduction means for reducing the angular velocity of the mechanical energy produced by said motor means;
rack means connected to said flashing part,
pinion means connected to an output end of said revolution speed reduction means for engaging with said rack means to rectilinearly move said flashing part; and
gear clutch means for disconnecting said pinion means from said revolution speed reduction means when said flashing part is moving from said predetermined flashing position to said predetermined rest position.

9. A flash camera in accordance with claim 7, wherein said first limit switch means supplies power from said power supply means to said electronic flashing unit when said flashing part reaches said predetermined flashing position.

10. A flash camera as in claim 7, wherein said time constant means comprises:
a first circuit connected to said power supply means through said second limit switch means comprising:
a first resistance;
a second resistance connected in series with said first resistance; and
a capacitance connected in parallel with said second resistance; and
a switching device, the trigger terminal of which is connected to the common connection of said first resistance, said second resistance and said capacitance, said switching device being controlled by a voltage produced at said common connection for disconnecting said power supply means from said electronic flashing unit when said voltage reaches a predetermined level.

11. A flash camera as in claim 7, wherein said electromagnetic means comprises:
electromagnetic solenoid means responsive to said first signal produced by said brightness detecting means for retaining said flashing part in said predetermined flashing position, said electromagnetic solenoid means including an extensible first engaging means for projecting from said solenoid means when said solenoid means is actuated by said first signal; and second engaging means fixed to said flashing part for engaging with said first engaging means.

12. A flash camera as in claim 7, further comprising:

a main capacitor which is charged to a predetermined voltage when said electronic flashing unit is ready to flash;

voltage detecting means for producing a third signal when said main capacitor is charged to said predetermined voltage; and hold-release inhibition means for inhibiting the deenergization of said electromagnetic means by causing said brightness detecting means to produce said second signal until said third signal is produced by said voltage detecting means after said flashing part has reached said predetermined flashing position, comprising:

control switching means for preventing said second switching means of said brightness detecting means from producing said first signal when said third signal is produced.

13. An flash camera as in claim 7 wherein said first switching means includes means for connecting said light measuring means to said power supply means.

* * * * *